United States Patent
Gupta

(10) Patent No.: US 8,434,132 B2
(45) Date of Patent: Apr. 30, 2013

(54) ROAMING BETWEEN NETWORKS EMPLOYING DIFFERENT AUTHENTICATION PROTOCOLS

(75) Inventor: Vivek Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 268 days.

(21) Appl. No.: 12/873,028

(22) Filed: Aug. 31, 2010

(65) Prior Publication Data

US 2012/0054840 A1    Mar. 1, 2012

(51) Int. Cl.
G06F 21/00      (2006.01)

(52) U.S. Cl.
USPC ............. 726/5; 726/3; 713/155; 713/168; 455/432.1; 455/414.1

(58) Field of Classification Search ............ 726/2–5; 713/155, 168; 455/432.1, 414.1
See application file for complete search history.

(56) References Cited

U.S. PATENT DOCUMENTS

2010/0177714 A1   7/2010   Hanaoka et al.
2010/0197281 A1   8/2010   Bennett et al.

FOREIGN PATENT DOCUMENTS

EP      2217025 A1      8/2010

OTHER PUBLICATIONS

"Wireless Broadband Alliance" Jul. 2007, pp. 1-2 from http://www.wballiance.com/newsroom/featured-news/wba-pressprekeases.html.*
McKeag, "The EAP heap: Wireless Authentication Protocols", pp. 1-6, Mar. 2004, from http://features.techworld.com/mobile-wireless/404/the-eap-heap-wireless-authentication-protocols/.*
"WiFi-WiMAX Internetworking," WiMAX Forum Network Architecture, Architecture, detailed Protocols and Procedures, Draft-T37-010-R016v01-A, Draft Specification, Jun. 10, 2010.
International Search Report mailed Jan. 2, 2012 from International Application No. PCT/US2011/046454.

* cited by examiner

Primary Examiner — Oscar Louie
Assistant Examiner — Lisa Lewis
(74) Attorney, Agent, or Firm — Schwabe, Williamson & Wyatt, P.C.

(57) ABSTRACT

Methods, systems, and apparatuses for receiving a first authentication message from a first authentication device of a first network employing a first authentication protocol, converting first authentication attributes in the first authentication message to second attributes, and transmitting a second authentication message including the second authentication attributes to a second authentication device of second network employing a second authentication protocol. A dual mode mobile device selects from amongst available networks and forwards authentication attributes to a selected network.

14 Claims, 7 Drawing Sheets

ROAMING BETWEEN NETWORKS EMPLOYING DIFFERENT AUTHENTICATION PROTOCOLS

TECHNICAL FIELD

The present disclosure generally relates to wireless communications, and in particular, to roaming and the facilitation of roaming between two disparate networks employing different authentication protocols.

BACKGROUND

As wireless communication becomes more and more popular, wireless networks of different types have become widespread. Currently, there is no single wireless protocol that has come to dominate the wireless access space, and various competing standards exist. The increased demands for connectivity has prompted the integration of multiple antennas into mobile devices to support one or more wireless access protocols such as WiFi (e.g., wireless protocols such as those defined by the IEEE 102.1x standards such as for example but not limited to IEEE std 802.11-2007, published Jun. 12, 2007), WiMAX (Worldwide Interoperability for Microwave Access IEEE std 802.16-2009, published Jun. 12, 2009), 2G (such as is deployed using the Global System for Mobile Communications (GSM) standards, TD-SCDMA, etc.), 3G (i.e., International Mobile Telecommunications-2000 (IMT-2000) such as UMTS, CDMA2000, etc.), and 4G (i.e., IMT-Advanced standards such as LTE, TD-LTE, etc.). Each of these may employ varying methods of authentication and accounting.

BRIEF DESCRIPTION OF THE DRAWINGS

Embodiments of the present disclosure will be described by way of exemplary illustrations, but not limitations, shown in the accompanying drawings in which like references denote similar elements, and in which.

DETAILED DESCRIPTION OF ILLUSTRATIVE EMBODIMENTS

Figure 1:
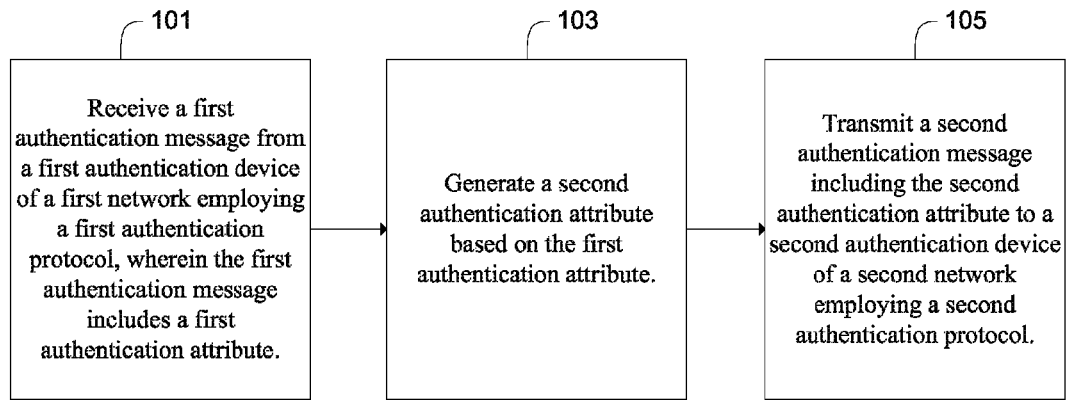
FIG. 1 illustrates a flow chart depicting a method of authentication conversion by an Authentication, Authorization, and Accounting (AAA) Interworking Function (AIF) system in accordance with embodiments of the present disclosure.

In the following detailed description, reference is made to the accompanying drawings which form a part hereof, and in which are shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present application include an Authentication, Authorization, and Accounting Interworking Function (AIF) system configured to allow or facilitate multi-mode mobile stations (such as devices having both WiMAX and WiFi antennas or other antenna types) to access two or more networks, even though the multi-mode device is associated with only a single subscription (e.g., a subscription to only a WiMAX service provider, a subscription to only a WiFi service provider, or a subscription to some other service provider type). The AIF system may be configured to map authentication message attributes and flags of a first authentication protocol to attributes and flags of a second authentication protocol, which may be different from the first authentication protocol. In other words, the two networks may employ different network communications protocols and/or different authentication protocols and the AIF system of the disclosed embodiments may be configured to convert authentication messages from one authentication protocol type to authentication messages of another authentication protocol type.

Embodiments include multi-mode mobile devices that may include network selection modules configured to select an available network based on certain parameters. The multi-mode mobile devices may have two or more radio modules and may be configured to connect to various networks that employ various network communications protocols (such as WiFi, WiMAX, 2G, 3G, 4G, or others). The multi-mode device may be associated with a subscription to a certain network operator or provider and may be configured to prefer networks associated with that network operator or provider.

The multi-mode device may be configured to connect to a non-preferred network (e.g., a network other than the network associated with a subscription of the mobile device) and to pass along authentication parameters to the non-preferred network. These authentication parameters may include authentication credentials associated with the subscription to the preferred network and/or an indication that the multi-mode device is associated with a subscription to the preferred network. In this instance, the multi-mode device may be "roaming" to the non-preferred network and the non-preferred network may be configured to pass along the authentication credentials to an AIF, as described within this Detailed Description.

FIG. 1 illustrates a flow chart depicting a method of authentication conversion by an AIF device in accordance with embodiments of the present disclosure. An AIF device may receive a first authentication message from a first authentication device of a first network employing a first authentication protocol, wherein the first authentication message includes a first authentication attribute, block 101. The AIF system may generate a second authentication attribute based on the first authentication attribute, block 103. The AIF device may transmit a second authentication message including the second authentication attribute to a second authentication device of a second network employing a second authentication protocol, block 105. In embodiments, the first authentication protocol may be the Remote Authentication Dial In User Service (RADIUS) protocol as specified by a Wireless Roaming Intermediary Exchange specification (WRIX), such as for example but not limited to WRIX-I, and the second authentication protocol may be another variant of the RADIUS protocol as specified by the Worldwide Interoperability for Microwave Access (WiMAX) R3 protocol interface. In alternate embodiments, the first authentication protocol may be specified by WiMAX R3 protocol interface and the second authentication protocol may be specified by Wireless Roaming Intermediary Exchange specifications. In still other embodiments, other authentication protocol types may be employed as either or both of the first authentication protocol and the second authentication protocol.

In embodiments, the first authentication message or the second authentication message may be an access request, a challenge, an authentication request, an access accept, or other authentication message type. Embodiments are not limited to any one type or types of authentication message types. In embodiments, the first or second authentication attributes may include, for example, an authentication credential of a multi-mode mobile device. In embodiments, the first and/or second authentication attributes may be an indication that the multi-mode mobile device is associated with a subscription, wherein the subscription is associated with the second network. In embodiments, the first authentication message and/or the second authentication message may utilize Extensible Authentication Protocol (EAP) (Extensible Authentication Protocol (EAP), Internet Engineering Task Force (IETF) RFC 3748, published June 2004).

Figure 2:
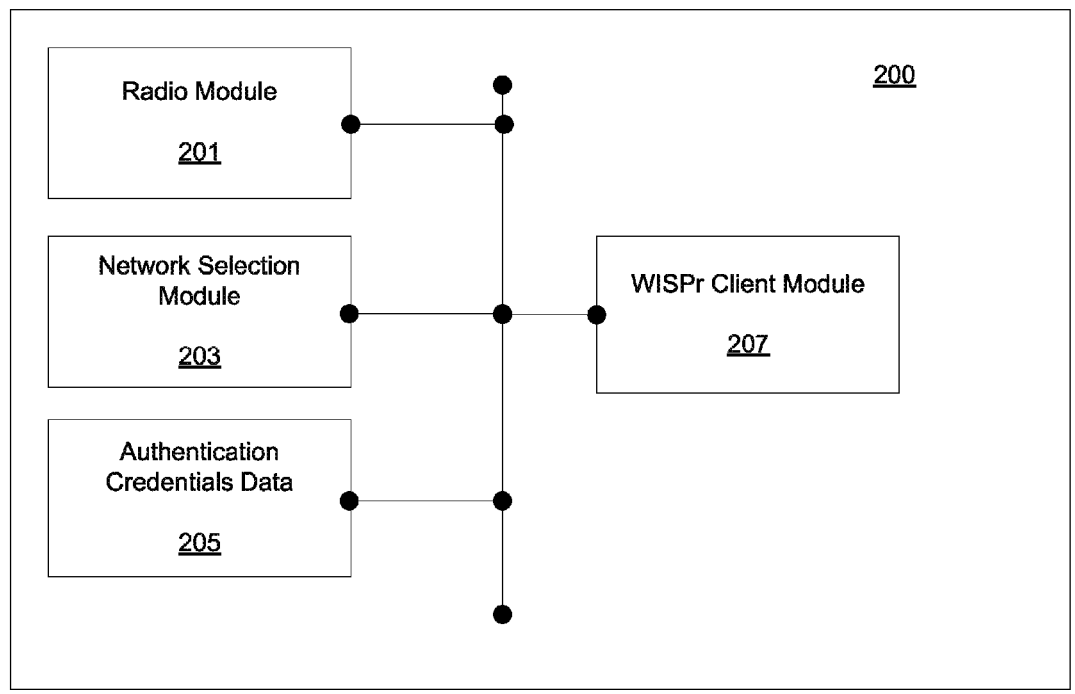
FIG. 2 illustrates a block diagram of a multi-mode mobile device in accordance with various embodiments.

FIG. 2 illustrates a block diagram of a multi-mode mobile device in accordance with various embodiments. Multi-mode mobile device 200 may include radio module 201 and network selection module 203 configured to cause radio module 201 to connect to a non-preferred wireless network from amongst one or more available wireless networks. Multi-mode mobile device 200 may include authentication credentials data 205 that may be associated with a subscription to a mobile network. Network selection module 203 may also be configured to the transmit authentication credentials data 205 associated with a preferred wireless network to the connected non-preferred network.

Network selection module 203 may include two or more protocol stacks (not shown) associated with two or more wireless networks (such as a preferred wireless network and a non-preferred wireless network). In embodiments, such protocol stacks may be part of a WiMAX module and/or a WiFi module. Authentication credentials data 205 may, in embodiments, not be shared between the WiMAX module and/or the WiFi module. Thus, authentication credentials data 205 may comprise two sets of credentials data, one to be used when roaming, and the other to be used when connecting to a network associated with a subscription of mobile device 200. In embodiments, components of such two or more protocol stacks may be shared between the two protocol stacks (for example TCP/IP networking functions may be shared between the two protocol stacks).

As described elsewhere within this Detailed Description, the preferred network may employ a first wireless access protocol and the non-preferred network may employ a second wireless access protocol that differs from the first wireless access protocol. In embodiments, radio module 201 may include a first radio configured to utilize the first wireless access protocol and a second radio configured to utilize the second wireless access protocol. In embodiments, radio module 201 may include a multi-functional radio configured to utilize two or more wireless access protocols. Embodiments are not limited to any type or types of radio modules.

In embodiments, authentication credentials data 205 may indicate (at least in part) that multi-mode mobile device 200 is associated with a subscription to a preferred wireless network. In embodiments, network selection module 203 may be configured to cause, upon a determination that the preferred wireless network is available, radio module 201 to connect to the preferred wireless network and to transmit the credentials data to the preferred wireless network. As used herein, "preferred wireless network" may be used to refer to a wireless network associated with a subscription of mobile device 200. "Preferred wireless network" is not meant to imply that mobile device 200 will always be configured to access the preferred wireless network if the preferred wireless network is available. For example, if radio module 201 receives a relatively weak signal from a "preferred wireless network," network selection module 203 may be configured to connect to a non-preferred wireless network having a signal that is stronger at a current location of mobile device 200. Other criteria may be employed by network selection module 203 to determine when and if to connect to a non-preferred wireless network even though a preferred wireless network is available; such criteria may include (but are not limited to) time-of-day, current network utilization for the preferred and/or non-preferred wireless networks, applications currently being utilized by mobile device 200, signal-to-noise ratios on the links to the preferred and non-preferred wireless networks, available bandwidth of the links to the preferred and/or the non-preferred wireless networks, etc.

In embodiments, the first wireless protocol may be a WiMAX protocol and the second wireless protocol may be a Wi-Fi protocol. In alternative embodiments, the first wireless protocol may be a Wi-Fi protocol and the second wireless protocol may a WiMAX protocol. Other combinations of the same or different wireless access protocols may be utilized by embodiments.

In embodiments, multi-mode mobile device 200 may be configured to connect to roam to a WiFi (such as for example 802.1x-enabled network). Wireless Internet Service Provider Roaming (WISPr) (see e.g., Wireless Broadband Alliance WISPr 2.0, version 1.0) client module 207 may be configured to connect to a WISPr portal and to pass authentication credentials data 205 to the WISPr portal as is described elsewhere within this Detailed Description.

In embodiments, mobile device 200 may comprise processor(s) (not shown). In such embodiments, network selection module 203 may comprise a software module (firmware, operating system component, application, etc.) stored as a plurality of programming instructions on a memory (not shown) and configured to be executed by one or more of the processor(s). In embodiments, one or more of the processor(s) may be a Field Programmable Gate Array (FPGA) and some or all of network selection module 203 and/or WISPr client module 207 may be executed as a programmed application on such FPGA. In embodiments, one or more of processor(s) may be an Application Specific Integrated Circuit (ASIC) and some or all of network selection module 203 and/or WISPr client module 207 may be configured as logic on such an ASIC.

Figure 3:
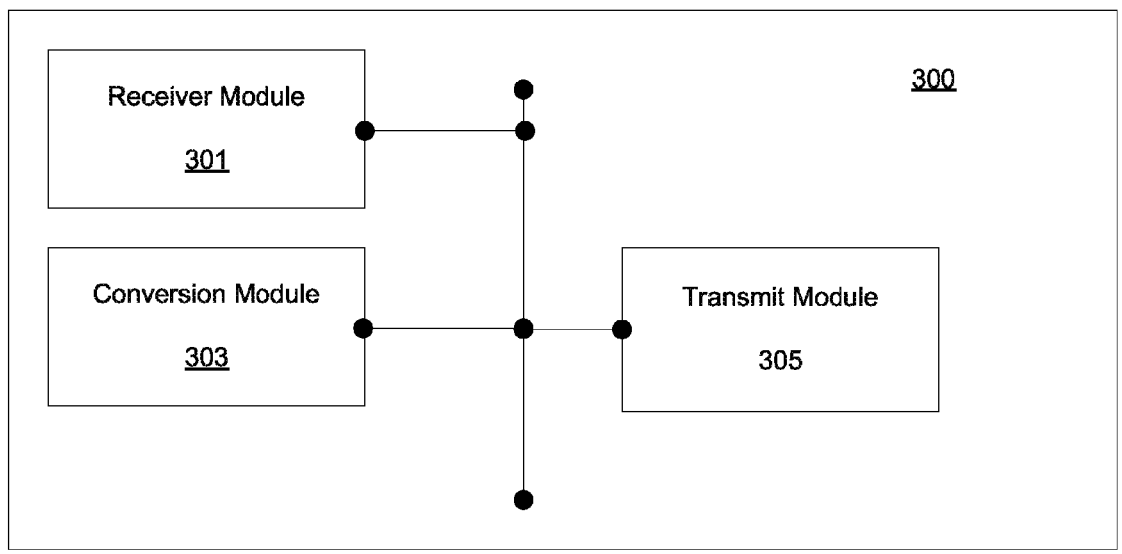
FIG. 3 illustrates a block diagram of an AIF system in accordance with various embodiments.

FIG. 3 illustrates a block diagram of an AIF system in accordance with various embodiments. AIF system 300 may include receiver module 301 configured to receive from a first network employing a first authentication protocol, a first authentication message having one or more first characteristics in accordance with the first authentication protocol. AIF system 300 may include a conversion module 303 configured to convert one or more first characteristics into one or more second characteristics, wherein the second characteristics are in accordance with a second authentication protocol that differs from the first authentication protocol. AIF system 300 may include a transmit module 305 configured to transmit a second authentication message including the one or more second characteristics to a second network employing the second authentication protocol.

In embodiments, the first authentication protocol may be specified by WRIX (such as for example WRIX-i) (Wireless Broadband Alliance WRIX Standard Service Specification, Umbrella Doc v1.05, Wireless Broadband Alliance WRIX Standard Service Specification, Interconnect Definition v1.05) and the second authentication protocol may be specified by WiMAX R3 protocol interface. In embodiments, the first authentication protocol may be WiMAX R3 interface and the second authentication protocol may be specified by WRIX (such as for example WRIX-i). In embodiments, the one or more first characteristics may include authentication credentials of a wireless device. In embodiments, the one or more first characteristics may include an indication that the mobile device is associated with a subscription to a provider of a second wireless network. In embodiments, at least the first authentication message or the second authentication message may utilize EAP.

In embodiments, AIF system may comprise processor(s) (not shown). In such embodiments, conversion module 303 may comprise a software module (firmware, operating system component, application, etc.) stored as a plurality of programming instructions on a memory (not shown) and configured to be executed by the processor(s). In embodiments, one or more of the processor(s) may be a Field Programmable Gate Array (FPGA) and some or all of conversion module 303 may be executed as a programmed application on such FPGA. In embodiments, one or more of the processor(s) may be an Application Specific Integrated Circuit (ASIC) and some or all of conversion module 303 may be configured as logic on such an ASIC.

Figure 4:
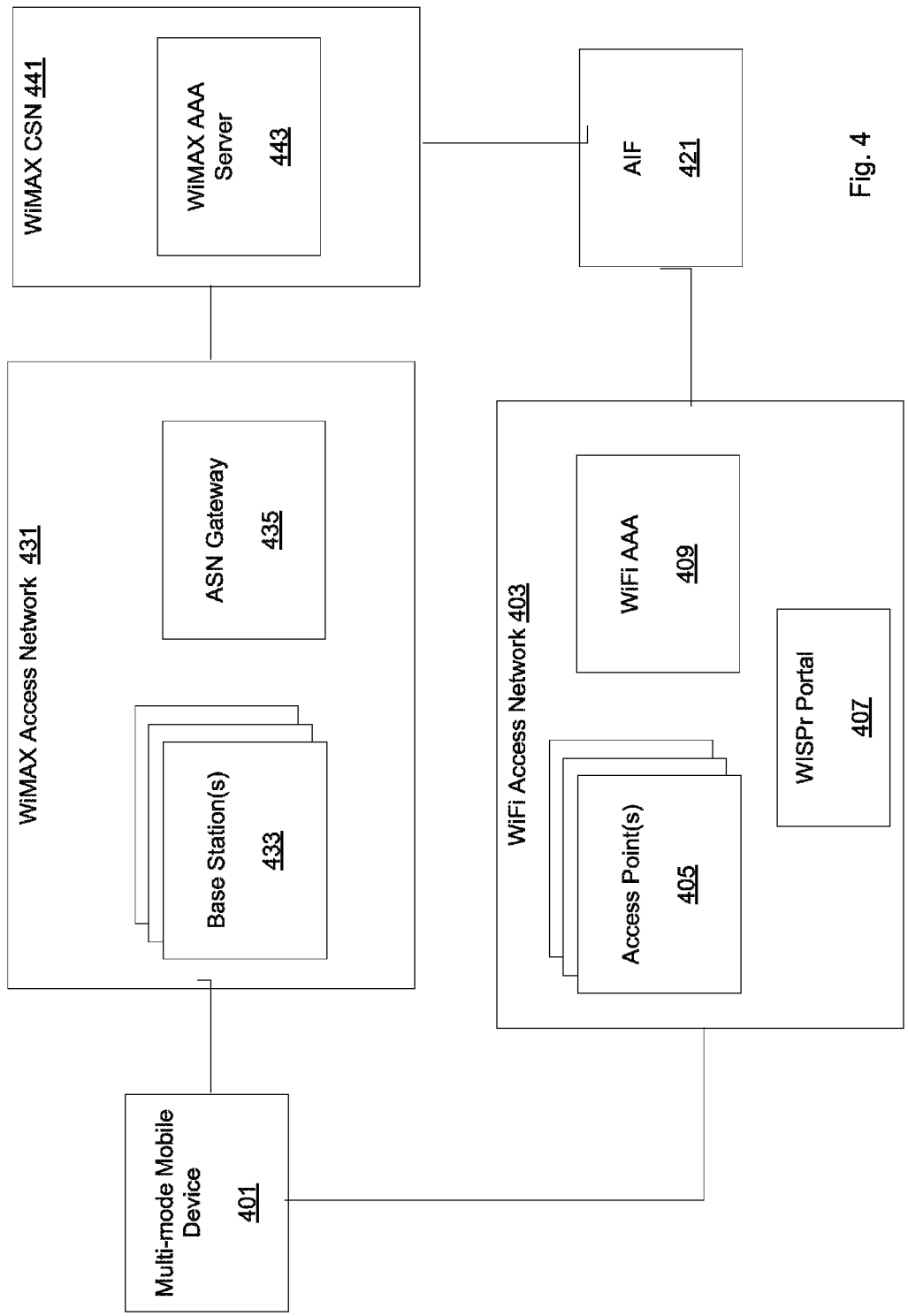
FIG. 4 illustrates a networking system including a multi-mode mobile device, multiple wireless networks, and an AIF system according to various embodiments.

FIG. 4 illustrates a networking system including a multi-mode mobile device, multiple wireless networks, and an AIF according to various embodiments. FIG. 4 depicts exemplary embodiments utilizing a WiMAX access network and a WiFi access network. Multi-mode mobile device 401 may be configured to connect wirelessly to both WiFi access network 403 using IEEE 802.1x protocol and WiMAX access network 431 utilizing WiMAX R1 protocol. Multi-mode mobile device 401 may be associated with a subscription to either WiFi access network 403 or WiMAX access network 431. WiFi access network 403 may include access point(s) (APs) 405, WISPr portal 407 (such as for example a WISPr 2.0 portal), and WiFi Authentication, Authorization, and Accounting (AAA) server 409. AP(s) 405, WISPr Portal(s) 407, and WiFi AAA server(s) 409 may be configured to perform various functions associated with authentication of multi-mode mobile device 401, such as may be described elsewhere within this Detailed Description.

WiMAX access network 431 may include base station(s) 433 and Access Server Network (ASN) Gateway 435. WiMAX Core Service Network (CSN) 441 may include WiMAX AAA server 443. Components within WiMAX access network 431 and WiMAX CSN 441 may be configured to perform various functions associated with authentication of multi-mode mobile device 401, such as may be described elsewhere within this Detailed Description.

AAA Interworking Function Server(s) (AIF) 421 may be configured to convert or map authentication messages, data, requests, etc. between WiFi AAA server(s) 409 and WiMAX AAA server 443 as may be described elsewhere within this Detailed Description. AIF 421 may also be configured to convert or map accounting messages between WiFi AAA server 409 and WiMAX AAA server 443.

Figure 5:
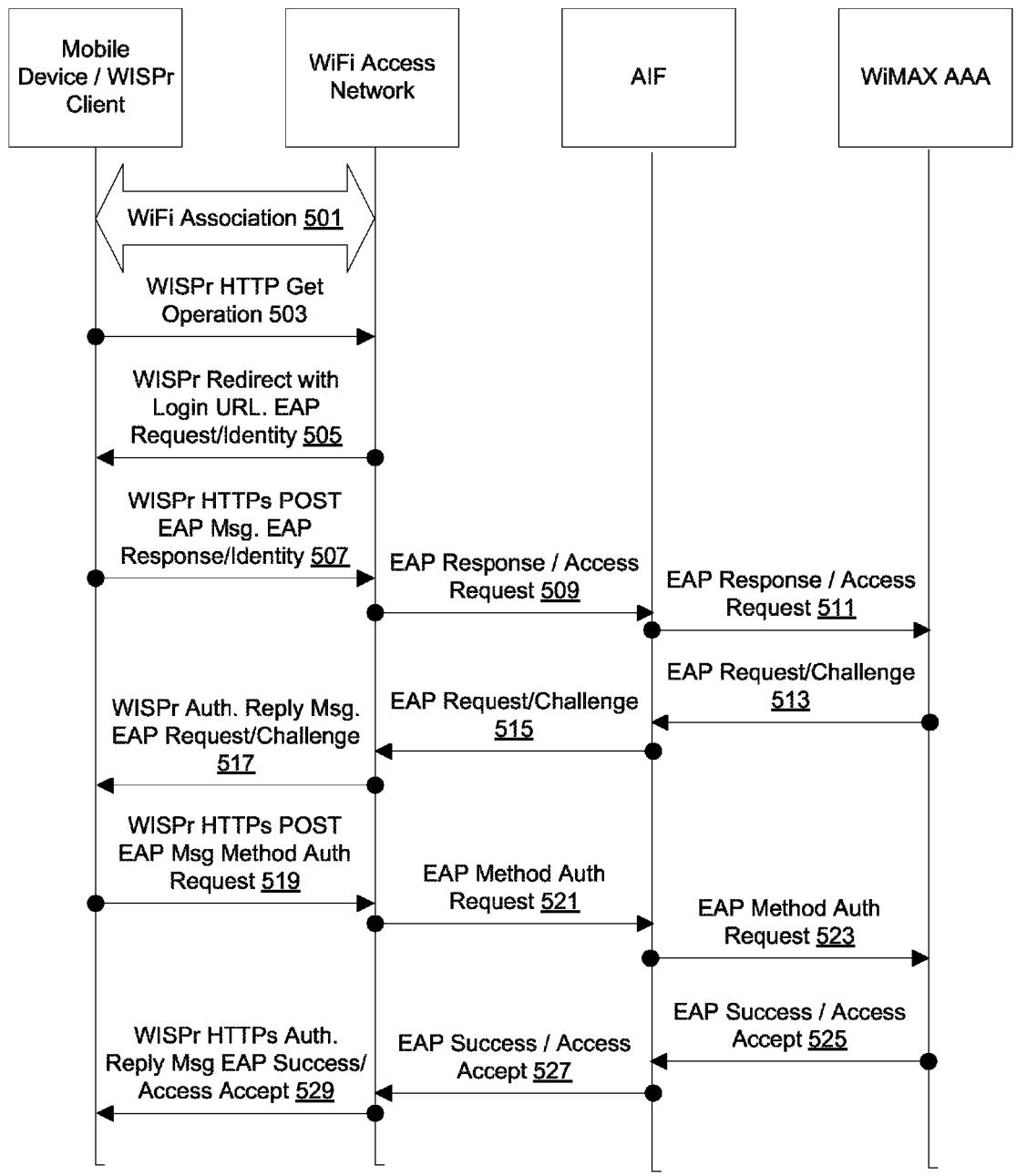
FIG. 5 illustrates exemplary protocol flow for roaming from a visited WiFi network according to embodiments.

FIG. 5 illustrates an exemplary protocol flow for roaming from a visited WiFi network according to embodiments. A multi-mode mobile device may establish an association with a WiFi access point of the WiFi access network, 501. A Wireless Internet Service Provider Roaming (WISPr) client of the multi-mode mobile device may utilize an unsecure HTTP GET operation to initiate a WISPr connection with a WISPr portal of the WiFi access network, 503. The Uniform Resource Locator (URL) used in the HTTP GET may be referred to as the "Arbitrary URL", which may trigger the WISPr protocol. The WISPr portal may respond with a Redirect, 505. If the access gateway of the WiFi access network supports EAP over WISPr, the response may contain an encoded EAP Request/Identity. The Redirect may also include a <loginURL> parameter that the WISPr client may use subsequently for authentication.

The client may send a WISPr HTTPs POST EAP message and request authentication by including an encoded EAP Response/Identity message, 507. A WiFi AAA server of the WiFi access network may use the Wireless Roaming Intermediary Exchange "i" (WRIX-i) specification to generate a RADIUS Access request message. The WiFi AAA may send the RADIUS Response/Access Request message as per the WRIX-i specification to the AIF, 509. The AIF may convert the RADIUS message from the WRIX-i specification to a WiMAX-R3 RADIUS message and send a WiMAX-R3 RADIUS Response/Access Request message to the WiMAX AAA in a WiMAX CSN, 511. The AIF may insert appropriate authentication attributes into the EAP Access Request message. Such attributes may include, but are not limited to, username, password, IP address of the multi-mode user device, service type, message authenticator, calling station identifier, event time stamp, session identifier, location name, and so forth. Such attributes may indicate to the WiMAX AAA, for example, that the message is from a mobile device associated with a WiMAX subscription and that the mobile device is attempting to roam through a visited WiFi network.

The WiMAX AAA may send a RADIUS Request/Challenge message as per WiMAX-R3 protocol interface to the AIF, 513. The AIF may convert this WiMAX-R3 RADIUS Request/Challenge message to a RADIUS access Challenge as per the WRIX-i specification and send it to the WISPr portal of the WiFi access network, 515. The WISPr portal of the WiFi access network may receive this message and send a WISPr Authentication Reply message which may contain a <EAPMsg> parameter encoded as a RADIUS Request/Challenge message, 517.

The WISPr client may send a WISPr HTTPs POST EAP message with Authentication Request to the WISPr Portal using an EAP method, 519. The WISPr Portal and/or the WiFi AAA may send a RADIUS EAP Method Authentication Request message to the AIF, 521. The AIF may convert the RADIUS EAP Method Authentication Request from the WRIX-i specification to a WiMAX-R3 RADIUS EAP Method Authentication Request and send the WiMAX R3 RADIUS EAP Method Authentication Request to the WiMAX AAA, 523. The AIF may insert appropriate attributes into the EAP authentication request message so that the WiMAX AAA can recognize that the message is from a mobile device associated with a WiMAX subscription and that the mobile device is attempting to roam through a visited WiFi network. Upon successful authentication, the WiMAX AAA may send an EAP Success/Access Accept message as per WiMAX R3 to the AIF, 525. The AIF may then convert the EAP Success/Access Accept message to a WRIX-i RADIUS Success/Access Accept message and send it to the WISPr portal, 527. The WISPr portal may then send a WISPr HTTPs Authentication Reply EAP Success to the WISPr client, 529. The WISPr portal may also include a <logoffURL> parameter that may be subsequently used to terminate the session. An appropriate accounting mode may also be selected as per the WiMAX capability attribute. At this point, a WiFi connection may be established, allowing the mobile device associated with a WiMAX subscription to access the WiFi network. Further details of the WiFi connection will not be further described.

Figure 6:
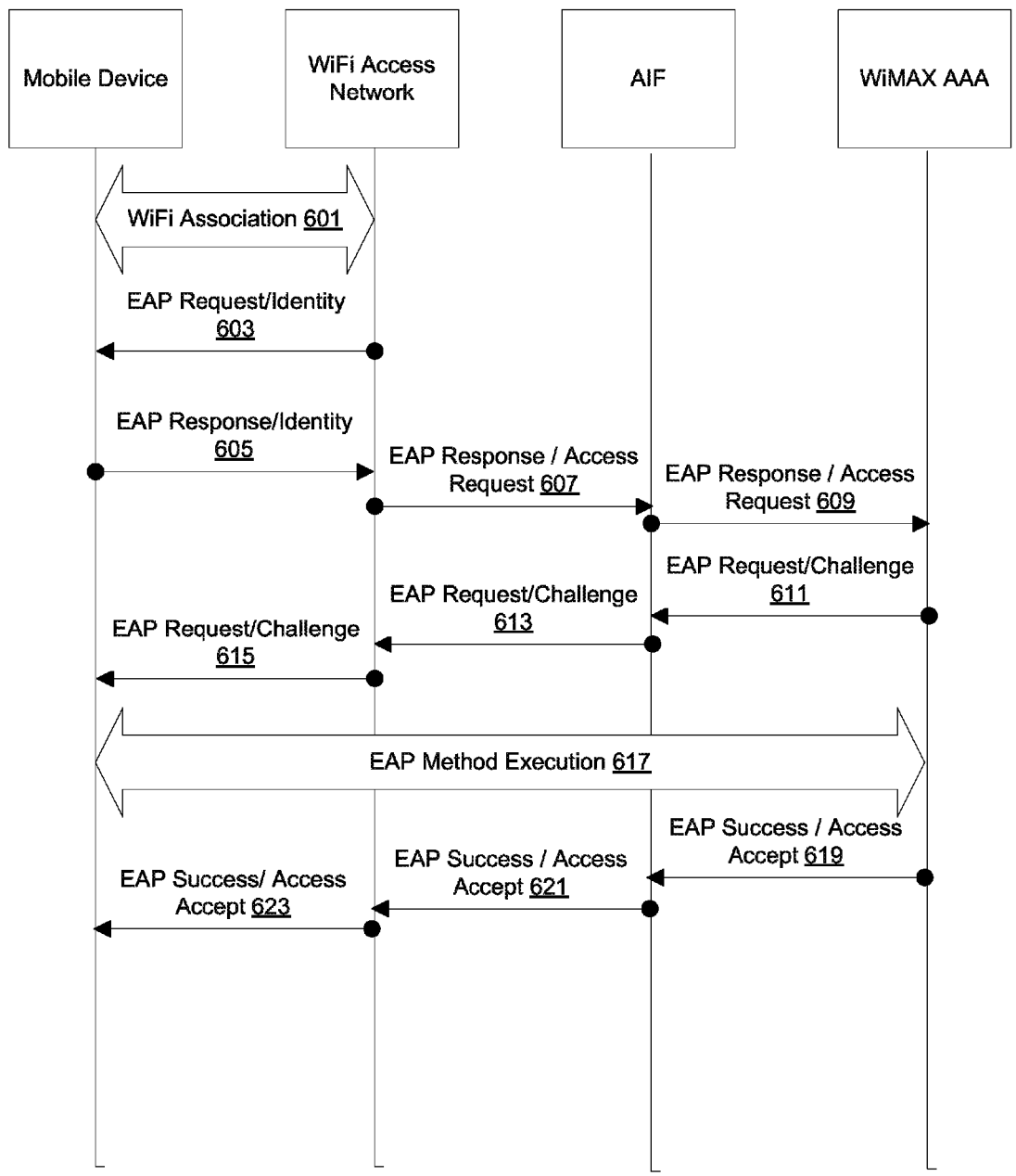
FIG. 6 illustrates exemplary protocol flow for roaming from a visited a WiFi network according to further embodiments.

FIG. 6 illustrates exemplary protocol flow for roaming from a visited WiFi network according to further embodiments. A mobile device may establish an association with a WiFi access point of a WiFi access network, 601. A WiFi AAA of the WiFi access network may send an EAP Request/Identity message to the mobile device, 603. The mobile device may reply by sending an EAP Response/Identity message to a WiFi Access Network Gateway of the WiFi access network, 605.

A WiFi Access Network Gateway (which may include a WiFi AAA) of the WiFi access network may use the WRIX-i specification to generate a Remote Authentication Dial In User Service (RADIUS) EAP Response/Access Request message. The WiFI Access Network Gateway may send the RADIUS EAP Response/Access Request message as per the WRIX-i specification to the AIF, 607. The AIF may convert the RADIUS EAP Response/Access Request message from the WRIX-i specification to a WiMAX-R3 EAP Response/Access Request message and send the WiMAX-R3 EAP Response/Access Request message to the WiMAX AAA in a WiMAX CSN, 609. The AIF may insert appropriate attributes into the EAP Response/Access Request message. Such attributes may include, but are not limited to, username, password, IP address of the multi-mode user device, service type, message authenticator, calling station identifier, event time stamp, session identifier, location name, and so forth. Such attributes may indicate to the WiMAX AAA, for example, that the message is from a mobile device associated with a WiMAX subscription and that the mobile device is attempting to roam through a visited WiFi network.

The WiMAX AAA may send a RADIUS Request/Challenge message as per WiMAX-R3 to the AIF, 611. The AIF may convert this WiMAX-R3 RADIUS Request/Challenge message to a RADIUS Request/Challenge as per the WRIX-i specification and send it to the WiFi access network, 613. The WiFI Access Network Gateway may receive this message and forward it to the mobile device, 615. At this point an EAP authentication method may be executed, according to any of various EAP methods, 617. Such methods are not described herein.

Upon successful authentication (after execution of the EAP authentication method), the WiMAX AAA may send an EAP Success/Access Accept message as per WiMAX R3 to the AIF, 619. The AIF may then convert the EAP Success/Access Accept message to a WRIX-i RADIUS EAP Success/Access Accept message (including inserting appropriate attributes such as for example, username, service type, message authenticator, IP address, timeout, session identifier, session key information, domain name service (DNS), account session identifier, error messages, service type, and so forth) and send it to the WiFi Access Network Gateway, 621. The WiFi AAA may then forward an EAP Success message to the multi-mode mobile device, 623. At this point, a WiFi connection may be established, allowing the mobile device to access the WiFi network. Further details of the WiFi connection will not be further described.

Figure 7:
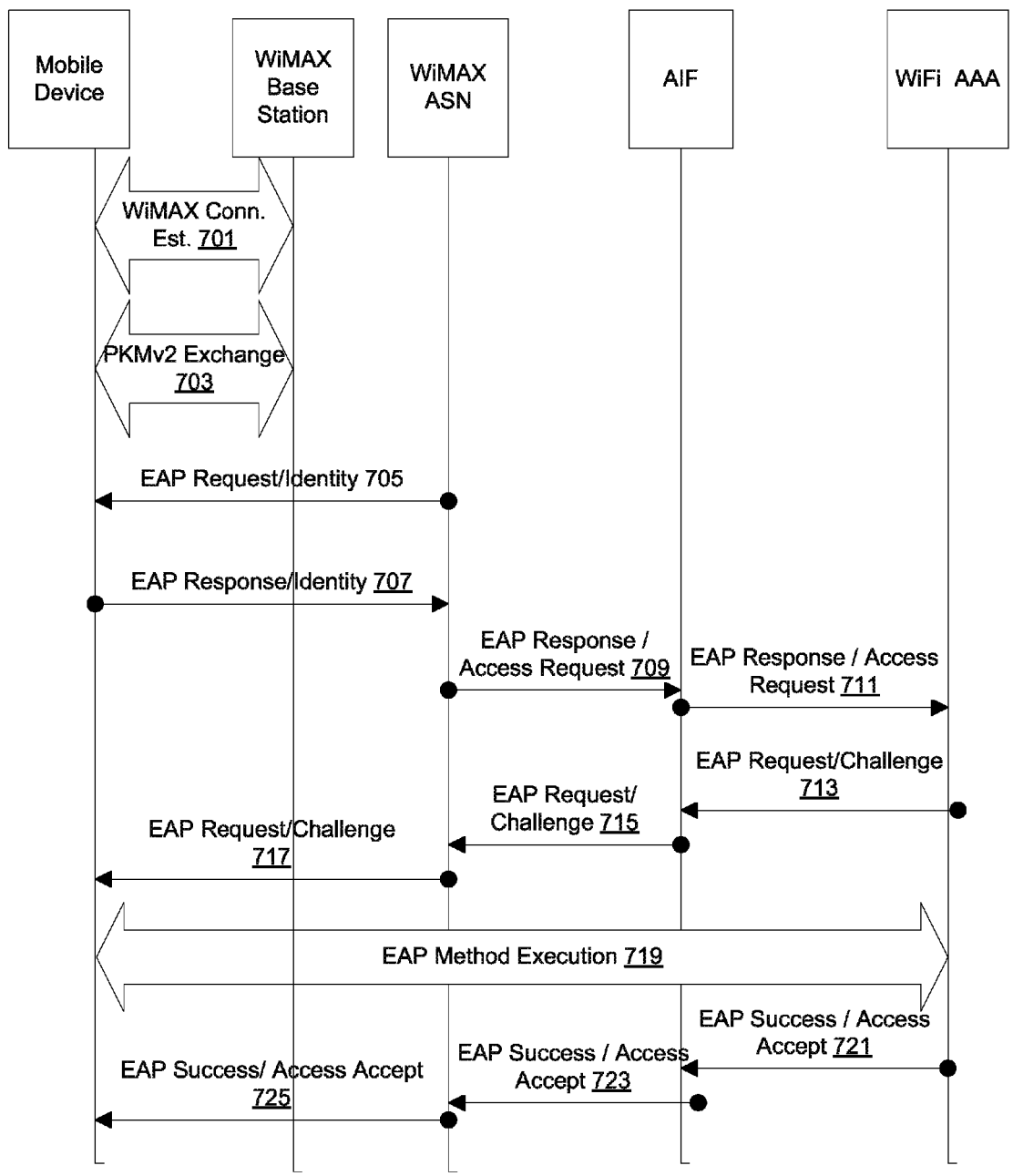
FIG. 7 illustrates exemplary protocol flow for roaming from a first network to a second network according to embodiments.

FIG. 7 illustrates exemplary protocol flow for roaming from a first network to a second network according to embodiments. A mobile device may establish a WiMAX connection with a WiMAX base station, 701. Next, a Privacy Key Management (PKMv2) exchange may occur between the dual-mode mobile device and the WiMAX base station, 703. A WiMAX Access Server Network (ASN) (e.g., the WiMAX AAA) may send an EAP Request/Identity message to the mobile device, 705. The mobile device may respond with an EAP Response/Identity message, 707.

The WiMAX ASN may use the WiMAX-R3 specification to generate a RADIUS EAP Response/Access Request message. The WiMAX ASN may send the WiMAX-R3 RADIUS EAP Response/Access Request message to the AIF, 709. The AIF may convert the WiMAX-R3 RADIUS EAP Response/Access Request message to a WRIX-i EAP Response/Access Request message and send the WRIX-i EAP Response/Access Request message to the WiFi AAA, 711. The AIF may insert appropriate attributes into the EAP Access Request message so that the WiFi AAA can recognize that the message is from a mobile device associated with a WiFi subscription and that the mobile device is attempting to roam through a visited WiMAX network. These and other attributes inserted into the EAP Access Request may include a message authenticator, a session-timeout, a session identifier, and so forth.

The WiFi AAA may send a RADIUS EAP Request/Challenge message to the AIF as per the WRIX-i specification, 713. The AIF may convert the WRIX-i RADIUS EAP Request/Challenge message to a WiMAX-R3 RADIUS EAP Request/Challenge (including inserting appropriate attributes including authentication attributes in the WiMAX RADIUS-R3 Access Challenge) and send the WiMAX-R3 RADIUS EAP Request/Challenge to the WiMAX ASN, 715. The WiMAX ASN may receive the WiMAX-R3 RADIUS EAP Request/Challenge and forward it to the mobile device, 717. At this point an EAP authentication method may be executed, according to any of various known or unknown EAP methods, 719. Such methods will not be described herein.

Upon successful authentication, the WiFi AAA may send a WRIX-i RADIUS EAP Success/Access Accept message to the AIF, 721. The AIF may then convert the WRIX-i RADIUS EAP Success/Access Accept message to a WiMAX-R3 RADIUS EAP Success/Access Accept message and send it to the WiMAX ASN, 723. The WiMAX ASN may then forward the EAP Success/Access Accept message to the mobile device, 725. At this point, the mobile device may be fully able to use the WiMAX network. Further details of the WiMAX connection will not be further described.

Figure 8:
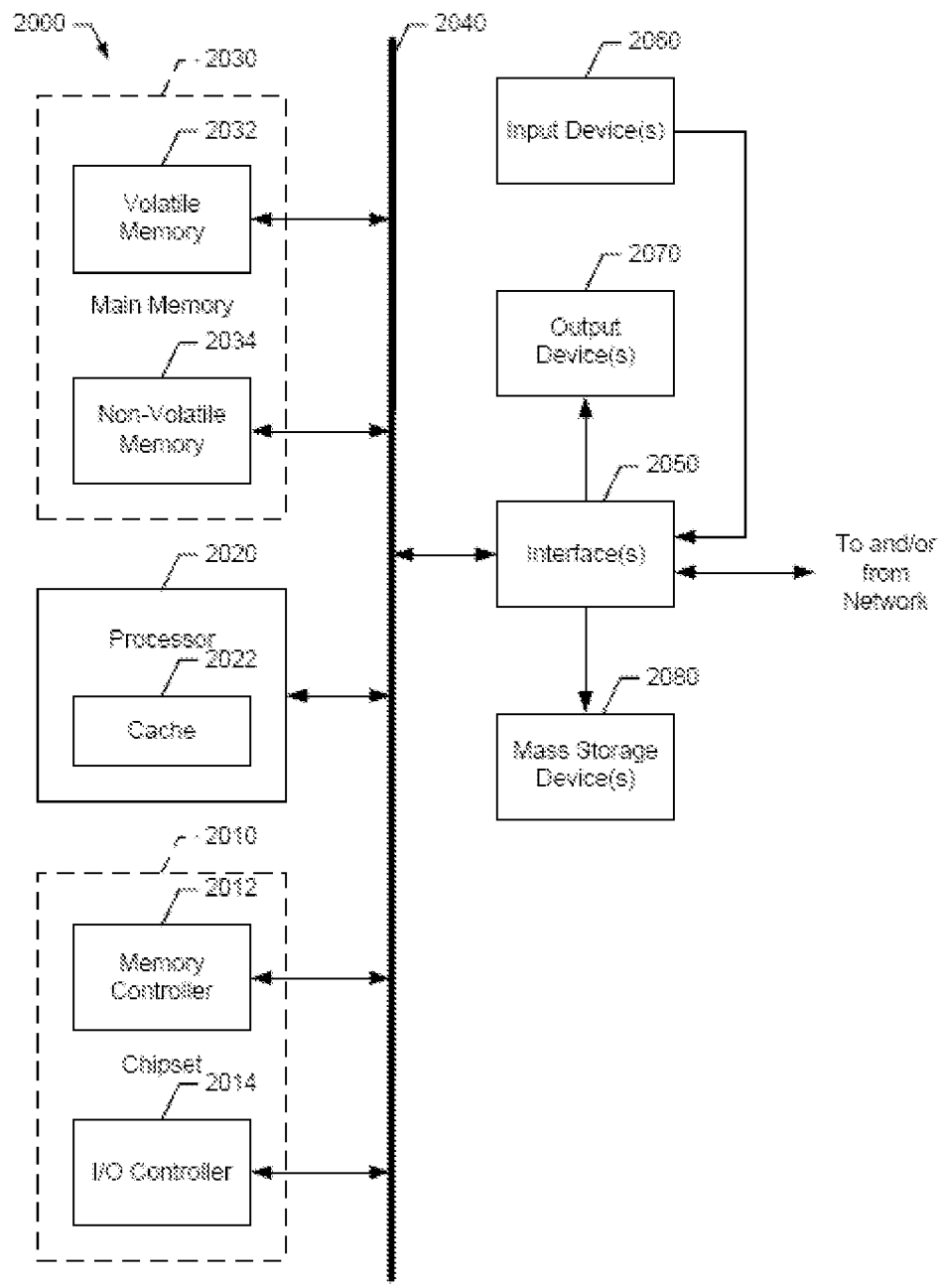
FIG. 8 is a block diagram of an example processor system 2000 adapted to implement the methods and apparatus disclosed herein.

FIG. 8 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 8 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, Wireless Personal Area Network (WPAN) components, Wireless Local Area Network (WLAN) components, Wireless Metropolitan Access Network (WMAN) components, Wireless Wide Area Network (WWAN) components, and/or other suitable processing components. For example, the processor 2020 may be implemented using one or more of the Intel® Core™ technology, Intel® Pentium® technology, the Intel® Itanium® technology, the Intel® Centrino™ technology, the Intel® Xeon™ technology, the Intel® XScale® technology, and/or Intel® ATOM™ technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output (2GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include one or more communication devices such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc. In various embodiments, the communication link may be a wireless connection based on wireless networks as previously illustrated in FIG. 1. The network interface card may couple with, or include, a radio receiver as disclosed above and illustrated in FIG. 3.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 8 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method comprising:
   receiving, from a first authentication device of a first network employing a first authentication protocol, a first authentication message for authenticating a mobile device to the first network, wherein the first authentication message includes a first authentication attribute;
   generating, responsive to receiving the first authentication message, a second authentication attribute based on the first authentication attribute;
   transmitting, responsive to generating the second authentication attribute, a second authentication message including the second authentication attribute to a second authentication device of a second network employing a second authentication protocol;

receiving, responsive to transmitting the second authentication message, a third authentication message from the second authentication device of the second network employing the second authentication protocol; and transmitting, responsive to receiving the third authentication message, a fourth authentication message to the first authentication device of the first network employing the first authentication protocol;

wherein at least the first authentication message or the second authentication message is selected from a group consisting of an access request and an authentication request, and the third authentication message or the fourth authentication message is selected from a group consisting of a challenge and an access accept;

wherein the first authentication protocol is based on a first specification that is a Wireless Roaming Intermediary Exchange specification or a Worldwide Interoperability for Microwave Access (WiMAX) R3 protocol interface specification; and wherein the second authentication protocol is based on a second specification that is the Wireless Roaming Intermediary Exchange specification or the WiMAX R3 protocol interface specification, and the first specification is different from the second specification.

2. The method of claim 1, wherein the first or second authentication attributes includes an authentication credential of a mobile device.

3. The method of claim 2, wherein the first or second authentication attributes is an indication that the mobile device is associated with a subscription, wherein the subscription is associated with the second network.

4. The method of claim 1, wherein at least the first authentication message or the second authentication message utilize Extensible Authentication Protocol.

5. An apparatus, comprising:
a receiver module configured to receive from a first network employing a first authentication protocol, a first authentication message having one or more first characteristics in accordance with the first authentication protocol;

conversion circuitry configured to convert the one or more first characteristics into one or more second characteristics in response to receiving the first authentication message at the receiver module, wherein the second characteristics are in accordance with a second authentication protocol that differs from the first authentication protocol;

a transmit module configured to transmit a second authentication message including the one or more second characteristics to a second network employing the second authentication protocol in response to conversion of the one or more first characteristics into the one or more second characteristics by the conversion circuitry;

the receiver module further configured to receive from the second network a third authentication message in response to a transmission of the second authentication message by the transmit module; and the transmit module further configured to transmit a fourth authentication message to the first network in response to receiving the third authentication message at the receiver module;

wherein at least the first authentication message or the second authentication message is selected from a group consisting of an access request and an authentication request, and the third authentication message or the fourth authentication message is selected from a group consisting of a challenge and an access accept; and wherein the first authentication protocol and the second authentication protocols are different ones of a Wireless Roaming Intermediary Exchange specification and Worldwide Interoperability for Microwave Access (WiMAX) R3 protocol interface.

6. The apparatus of claim 5, wherein the first network employs a WiMAX access protocol and wherein the second network employs a WiFi access protocol.

7. The apparatus of claim 5, wherein the first network employs a WiFi access protocol and wherein the second network employs a WiMAX access protocol.

8. The apparatus of claim 3, wherein the one or more first characteristics includes authentication credentials of a wireless device.

9. The apparatus of claim 8, wherein the one or more first characteristics includes an indication that the wireless device is associated with a subscription to a provider of a second wireless network.

10. The apparatus of claim 5, wherein at least the first authentication message or the second authentication message utilize Extensible Authentication Protocol.

11. One or more non-transitory computer readable media comprising instructions which, when executed on a processor, cause a device to:
receive, from a first authentication device of a first network employing a first authentication protocol, a first authentication message for authenticating a mobile device to the first network, wherein the first authentication message includes a first authentication attribute;

generate, responsive to reception of the first authentication message, a second authentication attribute based on the first authentication attribute;

transmit, responsive to generation the second authentication attribute, a second authentication message including the second authentication attribute to a second authentication device of a second network employing a second authentication protocol;

receive, responsive to transmission of the second authentication message, a third authentication message from the second authentication device of the second network employing the second authentication protocol; and transmit, responsive to reception of the third authentication message, a fourth authentication message to the first authentication device of the first network employing the first authentication protocol;

wherein at least the first authentication message or the second authentication message is selected from a group consisting of an access request and an authentication request, and the third authentication message or the fourth authentication message is selected from a group consisting of a challenge and an access accept;

wherein the first authentication protocol is based on a first specification that is a Wireless Roaming Intermediary Exchange specification or a Worldwide Interoperability for Microwave Access (WiMAX) R3 protocol interface specification; and wherein the second authentication protocol is based on a second specification that is the Wireless Roaming Intermediary Exchange specification or the WiMAX R3 protocol interface specification, and the first specification is different from the second specification.

12. The one or more non-transitory computer readable media of claim 11, wherein the first or second authentication attributes includes an authentication credential of a mobile device.

13. The one or more non-transitory computer readable media of claim 12, wherein the first or second authentication attributes is an indication that the mobile device is associated with a subscription, wherein the subscription is associated with the second network.

14. The one or more non-transitory computer readable media of claim 11, wherein at least the first authentication message or the second authentication message utilize Extensible Authentication Protocol.

* * * * *

UNITED STATES PATENT AND TRADEMARK OFFICE
CERTIFICATE OF CORRECTION

PATENT NO. : 8,434,132 B2
APPLICATION NO. : 12/873028
DATED : April 30, 2013
INVENTOR(S) : Vivek Gupta It is certified that error appears in the above-identified patent and that said Letters Patent is hereby corrected as shown below:

In the Claims

Column 12

Line 14, "...claim 3..." should read --...claim 5...--.

Signed and Sealed this
Fifth Day of May, 2015

Michelle K. Lee
*Director of the United States Patent and Trademark Office*